(12) United States Patent
Mestery et al.

(10) Patent No.: US 11,381,526 B2
(45) Date of Patent: Jul. 5, 2022

(54) MULTI-TENANT OPTIMIZED SERVERLESS PLACEMENT USING SMART NETWORK INTERFACE CARDS AND COMMODITY STORAGE

(71) Applicant: Cisco Technology, Inc., San Jose, CA (US)

(72) Inventors: Kyle Andrew Donald Mestery, Woodbury, MN (US); Ian James Wells, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 233 days.

(21) Appl. No.: 16/406,872

(22) Filed: May 8, 2019

(65) Prior Publication Data

US 2020/0358719 A1    Nov. 12, 2020

(51) Int. Cl.
*H04L 49/90* (2022.01)
*H04L 47/74* (2022.01)
*H04L 47/78* (2022.01)
*H04L 47/70* (2022.01)
*H04L 49/50* (2022.01)

(52) U.S. Cl.
CPC ............ *H04L 49/90* (2013.01); *H04L 47/74* (2013.01); *H04L 47/78* (2013.01); *H04L 47/822* (2013.01); *H04L 49/50* (2013.01)

(58) Field of Classification Search
CPC . G06F 2009/45579; G06F 2009/45595; G06F 9/45558; H04L 47/74; H04L 47/78; H04L 47/822; H04L 49/50; H04L 49/90
See application file for complete search history.

(56) References Cited

U.S. PATENT DOCUMENTS

| | | | |
|---|---|---|---|
| 8,489,701 B2 | 7/2013 | Manion et al. | |
| 9,519,501 B1 | 12/2016 | Cai et al. | |
| 9,641,385 B1 | 5/2017 | Daniel et al. | |
| 10,719,366 B1* | 7/2020 | Gasser | G06F 9/5044 |
| 2013/0061047 A1* | 3/2013 | Sridharan | H04L 12/4666 713/162 |
| 2013/0304903 A1* | 11/2013 | Mick | H04L 67/10 709/224 |
| 2018/0150240 A1* | 5/2018 | Bernat | H03M 7/60 |
| 2018/0285166 A1* | 10/2018 | Roy | G06F 11/34 |
| 2019/0042741 A1* | 2/2019 | Abodunrin | G06F 13/4068 |
| 2019/0163538 A1* | 5/2019 | Klein | G06F 9/505 |

(Continued)

OTHER PUBLICATIONS

Hellerstein, Joseph M. et al. "Serverless Computing: One Step Forward, Two Steps Back" CIDR' 19, Jan. 2019, Asilomar, CA, USA (8 pages).

(Continued)

*Primary Examiner* — Saad A. Waqas
(74) *Attorney, Agent, or Firm* — Merchant & Gould P.C.

(57) ABSTRACT

Multi-tenant optimized serverless placement using network interface card and commodity storage may be provided. A first request to execute a first function may be received. Next, it may be determined to execute the first function at a first network interface card. The first network interface card may include a plurality of processors. Then, a container may be created at the first network interface card. The container may have at least one processor of the plurality of processors. The first function may be executed at the container.

20 Claims, 5 Drawing Sheets

(56) References Cited

U.S. PATENT DOCUMENTS

2019/0294582 A1* 9/2019 Zhu .......................... G06F 16/27
2020/0097310 A1* 3/2020 Shukla .................... H04L 12/66
2020/0272490 A1* 8/2020 Brown .................. H04L 69/321

OTHER PUBLICATIONS

Zaid Al-Ali, et al. "Making Serverless Computing More Serverless" ericcrozner.com, UC Berkeley, Jul. 2018 (4 pages).
Notification of Transmittal of the International Search Report and the Written Opinion of the International Search Authority issued in International Application No. PCT/US2020/031040, dated Aug. 3, 2020, (15 pages).

* cited by examiner

US 11,381,526 B2

MULTI-TENANT OPTIMIZED SERVERLESS PLACEMENT USING SMART NETWORK INTERFACE CARDS AND COMMODITY STORAGE

TECHNICAL FIELD

The present disclosure relates generally to multi-tenancy data storage and more specifically to multi-tenant serverless function execution on smart network interface cards and a commodity storage.

BACKGROUND

Multi-tenancy is an architecture in which a single instance of software serves multiple user devices. Each user is called a tenant. Multi-tenancy may be economical because software development and maintenance costs are shared. Multi-tenancy architecture may be more useful for applications developed using serverless architecture. Serverless architecture, which may also be referred to as Function-as-a-Service (FaaS), is a category of cloud computing services that may allow users to develop, run, and manage application functionalities without the complexity of building and maintaining both physical infrastructure as well as software based infrastructure typically associated with developing and launching an application.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
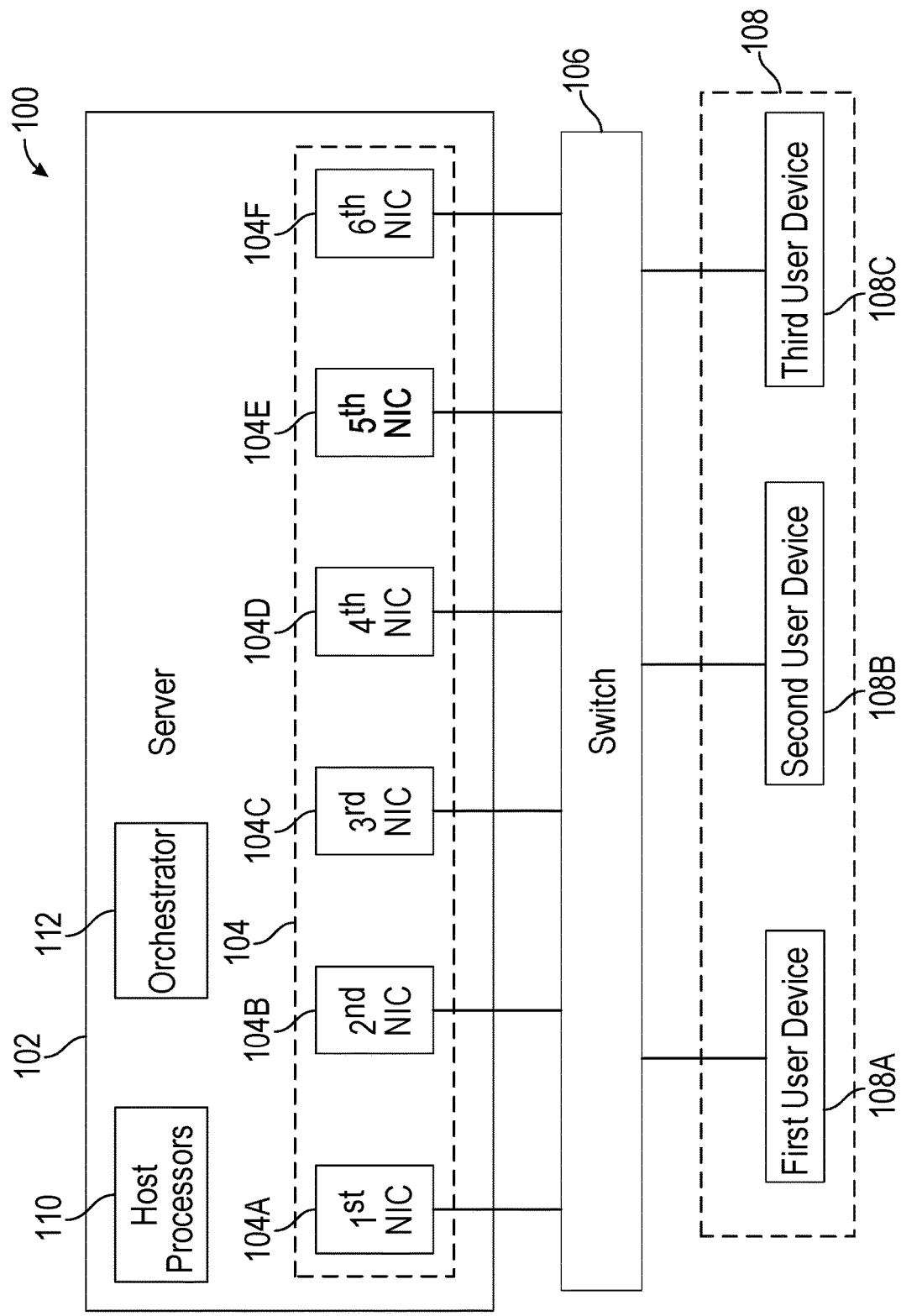
FIG. 1 is a block diagram of an example operating environment.

Multi-tenant optimized serverless placement using a network interface card and commodity storage may be provided. A first request to execute a first function may be received. Next, it may be determined to execute the first function at a first network interface card. The first network interface card may include a plurality of processors. Then, a container may be created at the first network interface card. The container may have at least one processor of the plurality of processors. The first function may be executed at the container.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

In serverless architecture based application development, an application may be broken down into independently deployable, small, modular functions, such as routing network traffic, making an online payment, or checking inventory. Each function of the application may be executed independently of others in a container. The container may provide the necessary environment including code, runtime, system tools, system libraries, etc. for the function to be executed. However, a challenge may be around getting the function execution as close as possible to the data. Due to ephemeral nature of the execution and direct ties to data, ensuring execution of these functions close to the data as possible may be desirable.

The present disclosure provides processes for multi-tenant optimized serverless placement using network interface cards (NICs) and a commodity storage. The processes may provide migrating a processing layer lower in a stack, thus allowing multi-tenancy at the NIC layer, thus allowing the serverless functions to be executed near where network traffic egresses into a host server. For example, a container may be created at a NIC associated with the host server. The NIC may be a smart NIC and may include an agent that may determine to execute the serverless function locally on the NIC based on a policy defined by an administrator. The agent may then create a container using one or more of NIC's processors. The function may then be executed in the container. Access to data on commodity storages may be provided over a Peripheral Component Interconnect express (PCIe) bus.

FIG. 1 is a block diagram of an example operating environment 100 in which multi-tenant optimized serverless placement using network an interface card and commodity storage may be provided. As shown in FIG. 1, operating environment 100 may comprise a server 102, NICs 104, a switch 106, user devices 108, host processors 110, and an orchestrator 112.

Server 102 may be a stand-alone server or may be part of a network of servers in a data center infrastructure. For example, server 102 may be a part of a serverless computing infrastructure operable to provide Function-as-a-Service (FaaS) that may allow users to develop, run, and manage application functionalities. Server 102 may support a multi-tenant environment in which multiple requests may be served concurrently.

For example, server 102 may be operable to provide a platform to user devices 108 comprising, for example, a first user device 108A, a second user device 108B, and a third user device 108C. Server 102 may provide a platform to develop, run, and manage functions of a serverless architecture based application. User devices 108 may request infrastructure through switch 106 for executing one or more functions of the serverless application. Switch 106 may provide a communication link between user devices 108 and server 102. Although server 102 is shown to be associated with three user devices, user devices 108 may comprise any number of user devices and are not limited to three.

Orchestrator 112 may be operative to create one or more containers for executing one or more serverless functions. For example, orchestrator 112 may create multiple containers using one or more processors of host processors 110. Orchestrator 112 may have visibility across application policies and application component runtime performance and infrastructure performance metrics including processing resources, storage resources, and network resources. Based on application policies, orchestrator 112 may deploy containers for execution of the serverless function. In addition, orchestrator 112 may scale containers if data to process/compute a serverless function exceeds a predetermined limit. Moreover, orchestrator 112 may handle failure of a container by performing automatic failovers.

Server 102 may be coupled to NICs 104 comprising, for example, a first NIC 104A, a second NIC 104B, a third NIC 104C, a fourth NIC 104D, a fifth NIC 104E, and a sixth NIC 104F. NICs 104 may provide a physical layer to communicatively couple server 102 to user devices 108 and other servers (not shown). NICs 104 may be integrated into server 102 or may be externally coupled to server 102. Although server 102 may be shown to be coupled to six NICs, NICs 104 is not limited to six NICs and may comprise any number of NICs. In addition, the number of NICs may be altered by removing NICs or plugging in additional NICs. In example embodiments, NICs 104 are also referred to as smart NICs 104.

Figure 2:
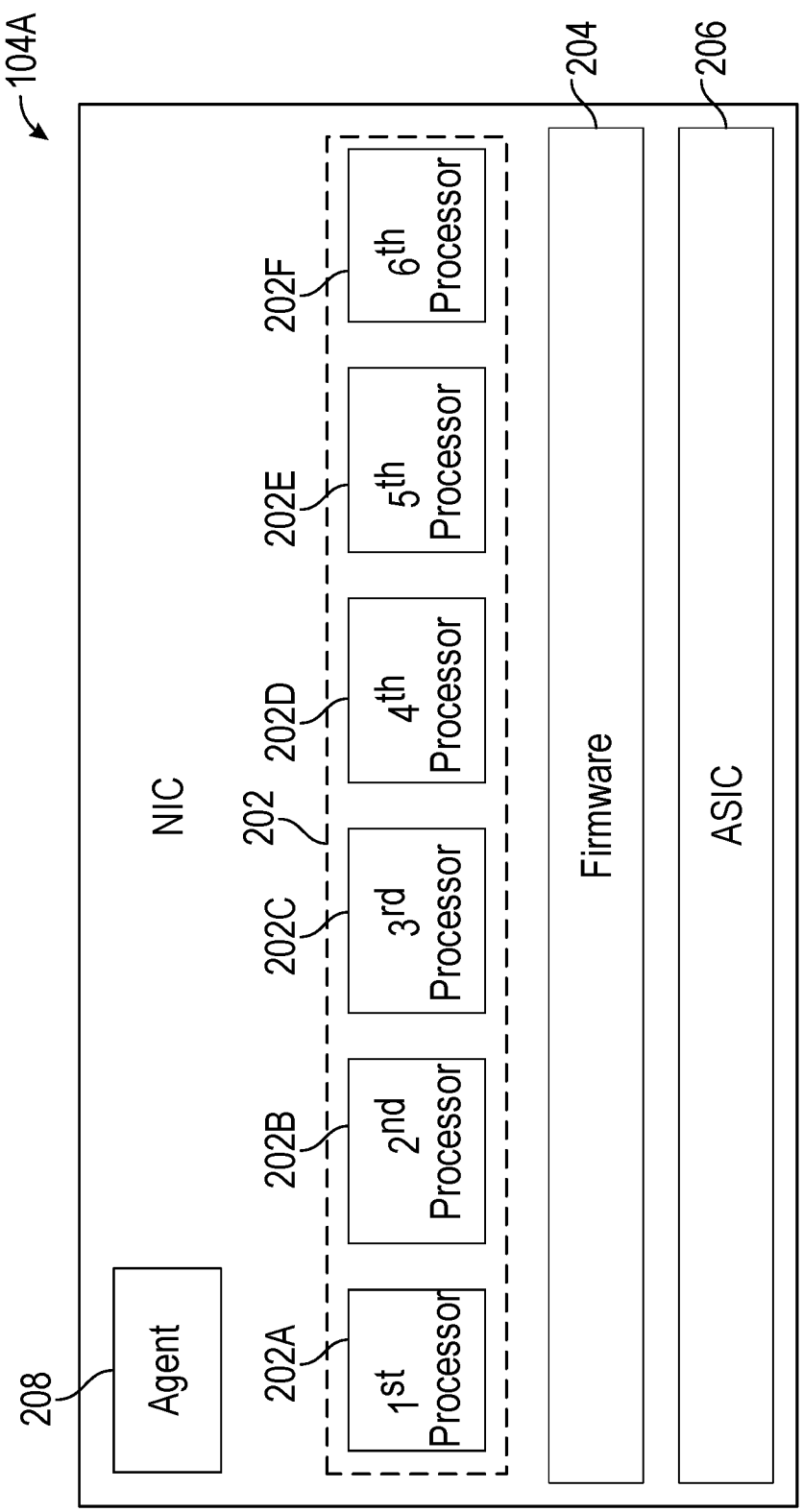
FIG. 2 is a block diagram of a network interface card.

FIG. 2 is a block diagram illustrating an example of one of NICs 104 (i.e., first NIC 104A). As shown in FIG. 2, first NIC 104A may include a plurality of processors 202 comprising, for example, a first processor 202A, a second processor 202B, a third processor 202C, a fourth processor 202D, a fifth processor 202E, and a sixth processor 202F. Each of plurality of processors 202 may be a multi-core low power processor. Although plurality of processors 202 may be shown to include six processors, plurality of processors 202 is not limited to six processors and may comprise any number of processors. In addition, the number of processors may be altered by removing processors or plugging in additional processors in first NIC 104A.

First NIC 104A may further include a firmware 204 and an Application Specific Integrated Circuit (ASIC) 206. ASIC 206 may be an integrated circuit customized to handle data traffic between user devices 108 and server 102. ASIC 206 may be a System-on-Chip (SoC) or a Field Programmable Gate Array (FPGA). ASIC 206 may include one or more local processors and one or more local memory blocks. Firmware 204 may sit on top of ASIC 206 and may, together with ASIC 206, be operative to process data packets received from user devices 108. For example, firmware 204 and ASIC 206 may be operative to process data packets of a network traffic to determine a destination of the data packets. Firmware 204 and ASIC 206 may be closely tied with plurality of processors 202. For example, plurality of processors 202 may be embedded on ASIC 206.

First NIC 104A may further include an agent 208. Agent 208 may be operative to determine whether to execute a request on first NIC 104A. Agent 208 may determine to execute the request on first NIC 104A based on a policy defined by an administrator or user devices 108. The policy may be based on a plurality of data points. For example, agent 208 may make the determination based on one or more of: i) a latency requirement for a first function; ii) network traffic ingesting into first NIC 104A; iii) location of data associated with the first function; iv) load parameters from first NIC 104A and host processors 110; and iv) security domains. The policy may define if it is acceptable to run the first function on plurality of processors 202 themselves, or if running them on first NIC 104A is required from a security perspective.

By using the data points listed above, agent 208 may determine whether to execute the first function on first NIC 104A, other NICs 104, or host processors 110. For example, agent 208 may execute the first function locally at first NIC 104A when the latency requirement of the first function is critical. That is, agent 208 may run the first function on first NIC 104A when the latency requirement of the first function is less than a predetermined latency value. For example, because first NIC 104A's bandwidth may be sized for network traffic, it may lead to lower latency. Hence, the first function requiring a lower latency may be executed locally on first NIC 104A. In addition, first NIC 104A may include Direct Memory Access (DMA) acceleration, which may also lead to lower latency. Moreover, agent 208 may determine to execute the first function locally when a load on one of host processors 110 is more than a predetermined load.

However, agent 208 may determine not to execute the first function on first NIC 104A when the first function does not include a latency requirement. In addition, agent 208 may determine to execute the first function on host processors 110 when the latency requirement associated with the first function is more than a predetermined value. Moreover, agent 208 may determine not to execute the first function on first NIC 104A when a load on first NIC 104A is more than a predetermined value. When agent 208 determines not to execute the first function on first NIC 104A, agent 208 may send the first request to second NIC 104B or to host processors 110. Hence, agent 208 may efficiently schedule execution of serverless functions across NICs 104 and host processors 110, taking into account polices defined by the administrator or user devices 108, as well as environmental concerns around network traffic and real-time input on operating environment 100. To execute the first function on first NIC 104A, agent 208 may create a container on first NIC 104A using plurality of processors 202. Agent 208 may, for example, comprise a container engine operative to create the container. In some embodiments, agent 208 may coordinate with orchestrator 112 to create the container.

Figure 3:
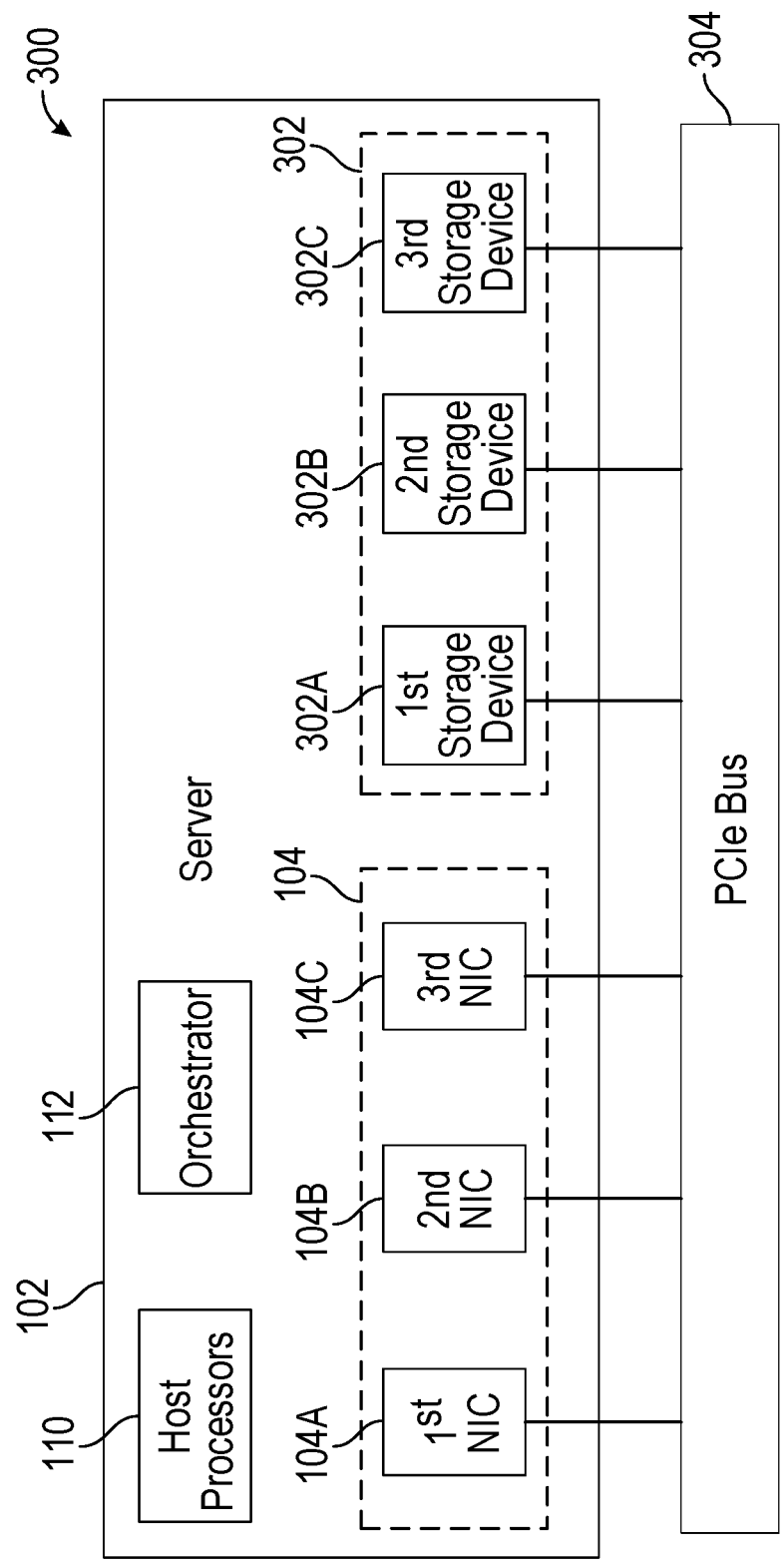
FIG. 3 is a block diagram of a system for providing multi-tenant optimized serverless placement using a network interface card and commodity storage.

FIG. 3 illustrates a system 300 for providing multi-tenant optimized serverless placement using a NIC and commodity storage. As shown in FIG. 3, system 300 may include server 102 that may include host processors 110 and orchestrator 112. Server 102 may be associated with NICs 104, for example, first NIC 104A, second NIC 104B, and third NIC 104C. Server 102 may further be associated with a plurality of storage devices 302, for example, a first storage device 302A, a second storage device 302B, and a third storage device 302C. Plurality of storage devices 302 may comprise commodity storage and may be operative to store data associated with serverless functions. Plurality of storage devices 302 may be managed by server 102. The stored data may be accessed over PCIe bus 304. NICs 104 may access the data associated with serverless functions over PCIe bus 304. System 300 may be operative to execute one or more functions at one of NICs 104 thus providing multi-tenant optimized serverless placement using NICs 104 and plurality of storage devices 302.

Figure 4:
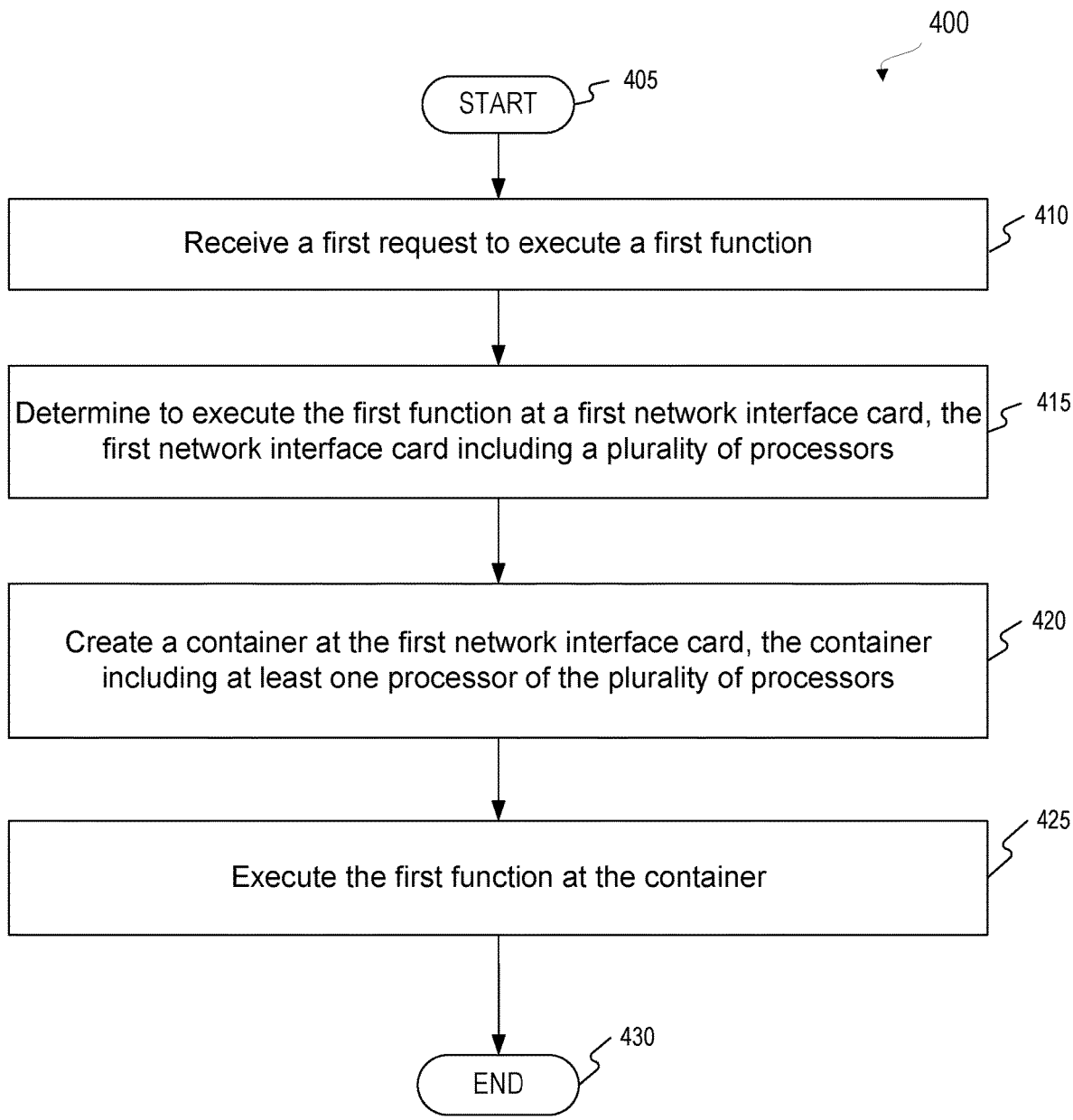
FIG. 4 is a flow chart of a method for providing multi-tenant optimized serverless placement using a network interface card and commodity storage.

FIG. 4 is a flow chart setting forth the general stages involved in a method 400 consistent with an embodiment of the disclosure for providing multi-tenant optimized serverless placement using a network interface card and commodity storage. Method 400 may be implemented by any of NICs 104 as described above with respect to FIG. 1, FIG. 2, and FIG. 3. A computing device 500 as described in more detail below with respect to FIG. 5 may comprise a working environment for any of NICs 104. Ways to implement the stages of method 400 will be described in greater detail below.

Elements shown in FIG. 1, FIG. 2, and FIG. 3 may be practiced in hardware and/or in software (including firmware, resident software, micro-code, etc.) or in any other circuits or systems. Elements shown in FIG. 1, FIG. 2, and FIG. 3 may be practiced in electrical circuits comprising discrete electronic elements, packaged or integrated electronic chips containing logic gates, a circuit utilizing a microprocessor, or on a single chip containing electronic elements or microprocessors. Elements shown in FIG. 1, FIG. 2, and FIG. 3 may also be practiced using other technologies capable of performing logical operations such as, for example, AND, OR, and NOT, including but not limited to, mechanical, optical, fluidic, and quantum technologies. As described in greater detail below with respect to FIG. 5, elements shown in FIG. 1, FIG. 2, and FIG. 3 may be practiced in a computing device 500

Method 400 may begin at block 405 and proceed to block 410 where a first request to execute a first function may be received. For example, a request for executing the first function may be received from one of user devices 108. The function may be a part of a serverless application and user devices 108 may be requesting FaaS via the first request. For example, first user device 108A may send the first request for executing the first function on server 102 to provide multi-tenant FaaS.

After receiving the first request at block 410, method 400 may proceed to block 415 where it may determine to execute the first function at first NIC 104A. For example, the determination to execute the first function at first NIC 104A may be made based on a policy. For example, an administrator may define a policy for execution of serverless functions. The policy may be provided to agent 208 of each of NICs 104. The policy may be based on one or more data points that agent 208 may refer to in order to make the determination. For example, agent 208 may make the determination based on one or more of: i) a latency requirement for the first function; ii) network traffic ingesting into first NIC 104A, location of data (i.e. closeness) associated with the first function; iii) load parameters from first NIC 104A and host processors 110; and iv) security domains. For example, the policy may define if it is acceptable to run the first function on server 102, or if running it on first NIC 104A is required from a security perspective.

By using the data points above, agent 208 may determine whether to execute the first function on first NIC 104A. For example, agent 208 may execute the first function location at first NIC 104A when the latency requirement of the first function may be critical. That is, agent 208 may run the first function on first NIC 104A when the latency requirement of the first function may be less than a predetermined latency value. For example, because first NIC 104A's bandwidth may be sized for network traffic, it may lead to lower latency. In addition, first NIC 104A may include DMA acceleration that may also lead to a lower latency. Moreover, agent 208 may determine to execute the first function locally when a load on host processors 110 is more than a predetermined load. In addition, first NIC 104A may determine to execute the first function locally in order to shield server 102 from untrusted or harmful functions.

However, agent 208 may determine not to execute the first function on first NIC 104A when the first function does not include a latency requirement or when the latency requirement is more than a predetermined value. Moreover, agent 208 may determine not to execute the first function on first NIC 104A when a load on first NIC 104A is more than a predetermined value. When agent 208 determines not to execute the first function on first NIC 104A, agent 208 may send the first request to a second NIC 104B or to host processors 110. Hence, agent 208 may efficiently schedule execution of serverless functions across NICs 104 and host processors 110, taking into account polices defined by the administrator, one or more user devices 108, as well as environmental concerns around network traffic and real-time input on operating environment 100.

Once having determined to execute the first function at first NIC 104A at block 415, method 400 may proceed to block 420 where a container may be created at first NIC 104A. For example, agent 208 may create a container having a selected number of processors from processors 202. The number of processors may depend on the processing requirements of the first function. In other example, agent 208 may create the container in coordination with orchestrator 112. The container may be communicatively coupled to storage devices 302 via PCIe bus 304. In one embodiment, agent 208 may create multiple containers on first NIC 104A. Each of these multiple containers may execute a function, thus simultaneously executing multiple functions. In example embodiments, in response to determining not to execute the first function at first NIC 104A at block 415, the first function may be executed at host processors 110 or another NIC, such as, second NIC 104B. In such embodiments, the container may be created at host processors 110 or second NIC 104B.

Once having created the container at block 420, method 400 may proceed to block 425 where the first function may be executed at the container. The container may access data associated with the first function from one or more of plurality of storage devices 302 over PCIe bus 304. After executing the first function at block 425, method 400 may end at block 430.

Figure 5:
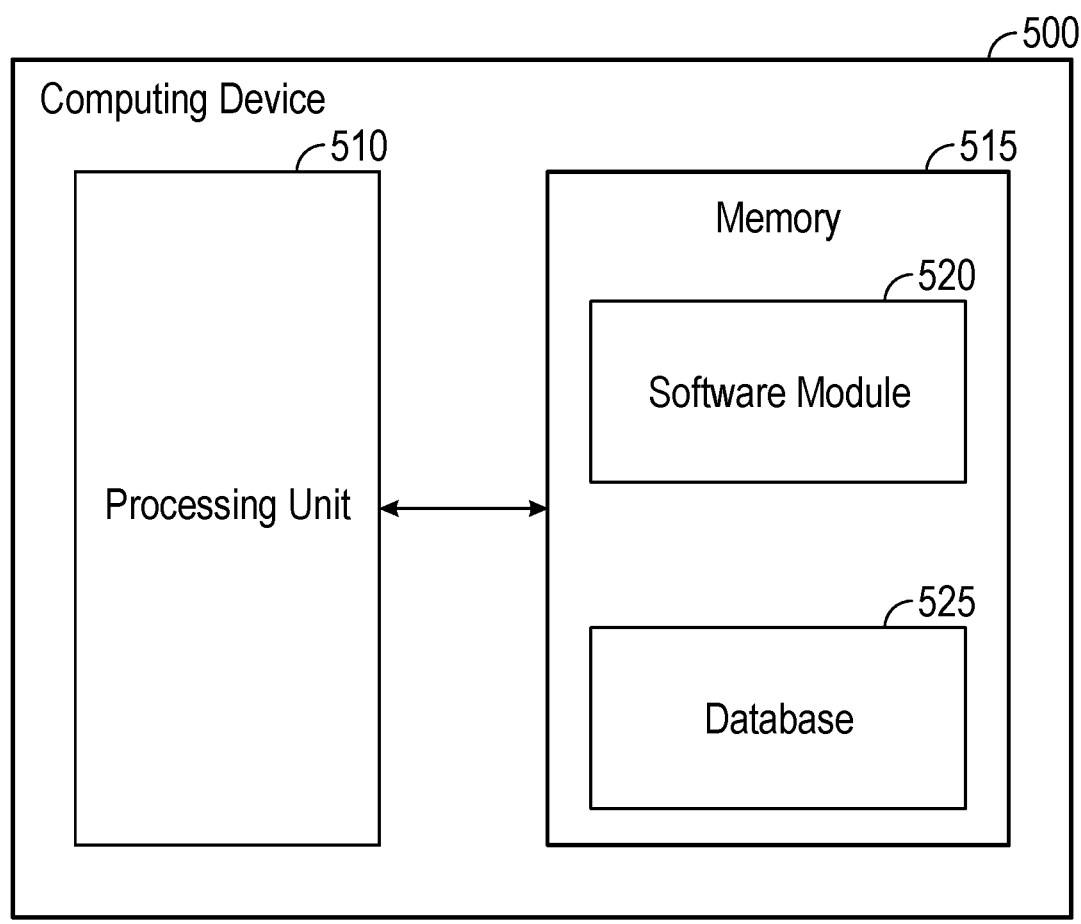
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform processes for optimized serverless placement using a network interface card and commodity storage, including for example, any one or more of the stages from method 400 described above with respect to FIG. 4. Computing device 500, for example, may provide an operating environment for server 102, NICs 104, and user devices 108. Server 102, NICs 104, and plurality of user devices 106 may operate in other environments and are not limited to computing device 500.

Computing device 500 may be implemented using a personal computer, a network computer, a mainframe, a router, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

There may be multiple advantages associated with executing serverless functions in containers on NICs 104 in terms of latency, scalability, and security. For example, NICs 104 may be associated with high bandwidth as they may be sized for network traffic and often may include DMA accelerations. Hence, NICs 104 may provide lower latency compared to containers running on host processors 110. In addition, NICs 104 may provide advantageous containers for high data throughput functions because of higher bandwidth and faster access to plurality of storage devices 302 overs PCIe bus 302. In addition, NICs 104 may provide scalable processing power as the number of processors 202 on NICs 104 may be expanded and contracted based on demand. Moreover, executing the serverless functions on NICs 104 may shield server 102 from harmful code, as server 102 may not directly be exposed to the harmful code.

Embodiments of the disclosure may provide a method comprising: receiving a first request to execute a first function; determining to execute the first function at a first network interface card, the first network interface card comprising a plurality of processors; creating a container at the first network interface card, the container comprising at least one processor of the plurality of processors; and executing the first function at the container. Receiving the first request to execute the first function may comprise receiving the first request to execute the first function wherein the first function is a serverless function.

In example embodiments, determining to execute the first function at the first network interface card may comprise determining to execute the first function at the first network interface card based on at least one of the following: an amount of data traffic being ingested into the first network interface card; a location of data to be accessed by the first function; a load on the first network interface card; and a security policy specifying execution of the first function on a server hosting the first network interface card.

According to embodiments determining to execute the first function at the first network interface card may comprise determining to execute the first function at the first network interface card when a latency requirement of the first function is less than a predetermined latency. Moreover, determining to execute the first function at the first network interface card may comprise determining to execute the first function at the first network interface card when a load on a server hosting the network interface card is more than a predetermined load. In addition, determining to execute the first function at the first network interface card may comprise determining to execute the first function at the first network interface card when a security policy specifies executing the first function on the first network interface card. The method may further include receiving a second request to execute a second function; determining not to execute the second function at the first network interface card; and sending the second request to one of the following: a second network interface card and a server associated with the first network interface card.

In example embodiments, an apparatus may include a memory storage and a processing unit coupled to the memory storage. The processing unit may be operative to receive a first data traffic comprising a first request to execute a first function; determine to execute the first function at a first network interface card, the first network interface card comprising a first plurality of processors; create a container at the first network interface card to execute the first function; and execute the first function in the container.

According to example embodiments, a non-transitory computer readable medium that may store a set of instructions, which when executed by a processor, may cause the performance a method comprising: receiving a first request to execute a first function; determining to execute the first function at one of a plurality of network interface cards, each of the plurality of network interface cards comprising a plurality of processors; determining, in response to determining to execute the first function at one of the plurality of network interface cards, a first network interface card from the plurality of network interface cards to execute the first function; creating a container at the first network interface card; and executing the first function at the container.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, at a first network interface card, a first request to execute a first function;
   determining, by the first network interface card, whether to execute the first function at the first network interface card, the first network interface card comprising a plurality of processors, wherein determining whether to execute the first function at the first network interface card comprises:
      determining, by the first network interface card, that the first function is not associated with a latency requirement,
      determining, by the first network interface card in response to determining that the first function is associated with the latency requirement, that the latency requirement is less than a predetermined latency value,
      determining, by the first network interface card in response to determining that the latency requirement is less than the predetermined latency value, that a load on the first network interface card is more than a predetermined load value, and
      determining, by the first network interface card in response to determining that the load on the first network interface card is not more than the predetermined load value, to execute the first function on the first network interface card, wherein the first network interface card to execute the first function is determined from a plurality of network interface cards based on closeness of a location of a data storage, the data storage storing data corresponding to the first function;
   creating, in response to determining to execute the first function at the first network interface card, a container at the first network interface card, the container comprising at least one processor of the plurality of processors; and
   executing the first function at the container.

2. The method of claim 1, wherein receiving the first request to execute the first function comprises receiving the first request to execute the first function wherein the first function is a serverless function.

3. The method of claim 1, wherein determining to execute the first function at the first network interface card comprises determining to execute the first function at the first network interface card based on at least one of:
   an amount of data traffic being ingested into the first network interface card;
   or
   a security policy specifying execution of the first function on a server hosting the first network interface card.

4. The method of claim 1, wherein determining to execute the first function at the first network interface card comprises determining to execute the first function at the first network interface card when a security policy specifies executing the first function on the first network interface card.

5. The method of claim 1, further comprising:
   receiving a second request to execute a second function;
   determining not to execute the second function at the first network interface card; and
   sending the second request to one of the following: a second network interface card and a server associated with the first network interface card.

6. An apparatus comprising:
   a memory storage; and
   a processing unit coupled to the memory storage, wherein the processing unit is operative to:
      receive, by a first network interface card, a first data traffic comprising a first request to execute a first function;
      determine, by the first network interface card, whether to execute the first function at the first network interface card, the first network interface card comprising a plurality of processors, wherein the processing unit being operative to determine whether to execute the first function at the first network interface card comprises the processing unit being operative to:
         determine, by the first network interface card, that the first function is not associated with a latency requirement,
         determine, by the first network interface card in response to determining that the first function is associated with the latency requirement, that the latency requirement is less than a predetermined latency value,
         determine, by the first network interface card in response to determining that the latency requirement is less than the predetermined latency value, that a load on the first network interface card is more than a predetermined load value, and
         determine, by the first network interface card in response to determining that the load on the first network interface card is not more than the predetermined load value, to execute the first function on the first network interface card, wherein the first network interface card to execute the first function is determined from a plurality of network interface cards based on closeness of a location of a data storage, the data storage storing data corresponding to the first function;
create, by the first network interface card in response to determining to execute the first function at the first network interface card, a container at the first network interface card to execute the first function; and
execute the first function in the container.

7. The apparatus of claim 6, wherein the first network interface card is operable to access the data from the data storage via a peripheral component interconnect express bus.

8. The apparatus of claim 6, wherein the first network interface card comprises an agent, wherein the agent is operative to facilitate in creating the container comprising at least one processor of the plurality of processors.

9. The apparatus of claim 6, wherein the processing unit is further operative to:
receive a second data traffic comprising a second request to execute a second function;
determine not to execute the second function at the first network interface card; and
send the second request to at least one of a second network interface card or a server associated with the first network interface card.

10. The apparatus of claim 9, wherein the processing unit being operative to determine not to execute the second function at the first network interface card comprises the processing unit is operative to determine not to execute the second function at the first network interface card based on based on at least one of:
an amount of data traffic being ingested into the first network interface card;
or
a security policy specifying execution of the second function on one of the first network interface card and the server.

11. The apparatus of claim 9, wherein the processing unit being operative to determine not to execute the second function at the first network interface card comprises the processing unit being operative to determine not to execute the second function at the first network interface card when the load on the first network interface card is more than a predetermined load.

12. The apparatus of claim 9, wherein the processing unit being operative to determine not to execute the second function at the first network interface card comprises the processing unit being operative to determine not to execute the second function at the first network interface card when a latency requirement for the second function is more than a predetermined latency value.

13. The apparatus of claim 6, wherein first network interface card closest to the data associated with execution of the first function.

14. A non-transitory computer readable medium that stores a set of instructions, which when executed by a processor, cause the performance a method comprising:
receiving, by a first network interface card, a first request to execute a first function;
determining, by the first network interface card, whether to execute the first function at the first network interface card of a plurality of network interface cards, each of the plurality of network interface cards comprising a plurality of processors, wherein determining whether to execute the first function at the first network interface card comprises:
determining, by the first network interface card, that the first function is not associated with a latency requirement,
determining, by the first network interface card in response to determining that the first function is associated with the latency requirement, that the latency requirement is less than a predetermined latency value,
determining, by the first network interface card in response to determining that the latency requirement is less than the predetermined latency value, that a load on the first network interface card is more than a predetermined load value, and
determining, by the first network interface card in response to determining that the load on the first network interface card is not more than the predetermined load value, to execute the first function on the first network interface card, wherein the first network interface card to execute the first function is determined from a plurality of network interface cards based on closeness of a location of a data storage, the data storage storing data corresponding to the first function;
creating, by the first network interface card in response to determining to execute the first function at the first network interface card of the plurality of network interface cards, a container at the first network interface card; and
executing the first function at the container.

15. The non-transitory computer readable medium of claim 14, wherein, the method further comprises:
receiving a second request to execute a second function; and
determining not to execute the second function at first network interface card.

16. The non-transitory computer readable medium of claim 14, further comprising isolating a server associated with the first network interface card from executing the first function.

17. The non-transitory computer readable medium of claim 14, wherein receiving the first request comprises receiving the first request at the first network interface card closest to the data associated with execution of the first function.

18. The non-transitory computer readable medium of claim 14, wherein determining not to execute the second function at the first network interface card comprises determining not to execute the second function at the first network interface card when the load on the first network interface card is more than a predetermined load.

19. The non-transitory computer readable medium of claim 14, wherein determining not to execute the second function at the first network interface card comprises determining not to execute the second function at the first network interface card when a latency requirement for the second function is more than a predetermined latency value.

20. The non-transitory computer readable medium of claim 14, wherein the first network interface card is operable to access the data from the data storage via a peripheral component interconnect express bus.

* * * * *